United States Patent [19]

Verlander et al.

[11] 4,362,699

[45] Dec. 7, 1982

[54] APPARATUS FOR HIGH PRESSURE PEPTIDE SYNTHESIS

[75] Inventors: Michael S. Verlander, Del Mar; William D. Fuller, San Diego; Murray Goodman, La Jolla, all of Calif.

[73] Assignee: Bio Research, Inc., La Jolla, Calif.

[21] Appl. No.: 242,232

[22] Filed: Mar. 10, 1981

[51] Int. Cl.³ .................... B01J 8/02; C07C 103/52; G05D 16/00

[52] U.S. Cl. .................... 422/131; 23/230 A; 260/112.5 R; 422/111; 422/113; 422/116; 422/135; 422/211; 422/234

[58] Field of Search ............ 422/108, 111, 113, 116, 422/129, 131, 135, 211, 234, 62; 260/112.5 R; 435/69, 71; 23/230 A

[56] References Cited

U.S. PATENT DOCUMENTS

| | | | |
|---|---|---|---|
| 2,761,882 | 9/1956 | Hulse et al. | 422/234 X |
| 3,531,258 | 9/1970 | Merrifield et al. | 422/116 |
| 3,557,077 | 1/1971 | Brufeldt et al. | 422/108 |
| 3,647,390 | 3/1972 | Kubodera et al. | 422/116 |
| 3,951,741 | 4/1976 | Pfaender et al. | 435/69 |

Primary Examiner—Michael S. Marcus
Attorney, Agent, or Firm—Larson and Taylor

[57] ABSTRACT

An apparatus for synthesizing a polypeptide chain on an insoluble solid support in a continuous flow reactor by performing a series of stepwise coupling reactions under high pressure is disclosed. A deprotecting agent reservoir, a solvent reservoir, a neutralizing solution reservoir, and a plurality of amino acid reservoirs are provided. Each reservoir can be selectively coupled to the reactor and a source of high pressure inert gas or an appropriate pump can be used to force the fluids as needed to the reactor. The reactor also includes a recycle loop whereby the amino acid from a particular reservoir can be recycled through the reactor under high pressure.

9 Claims, 1 Drawing Figure

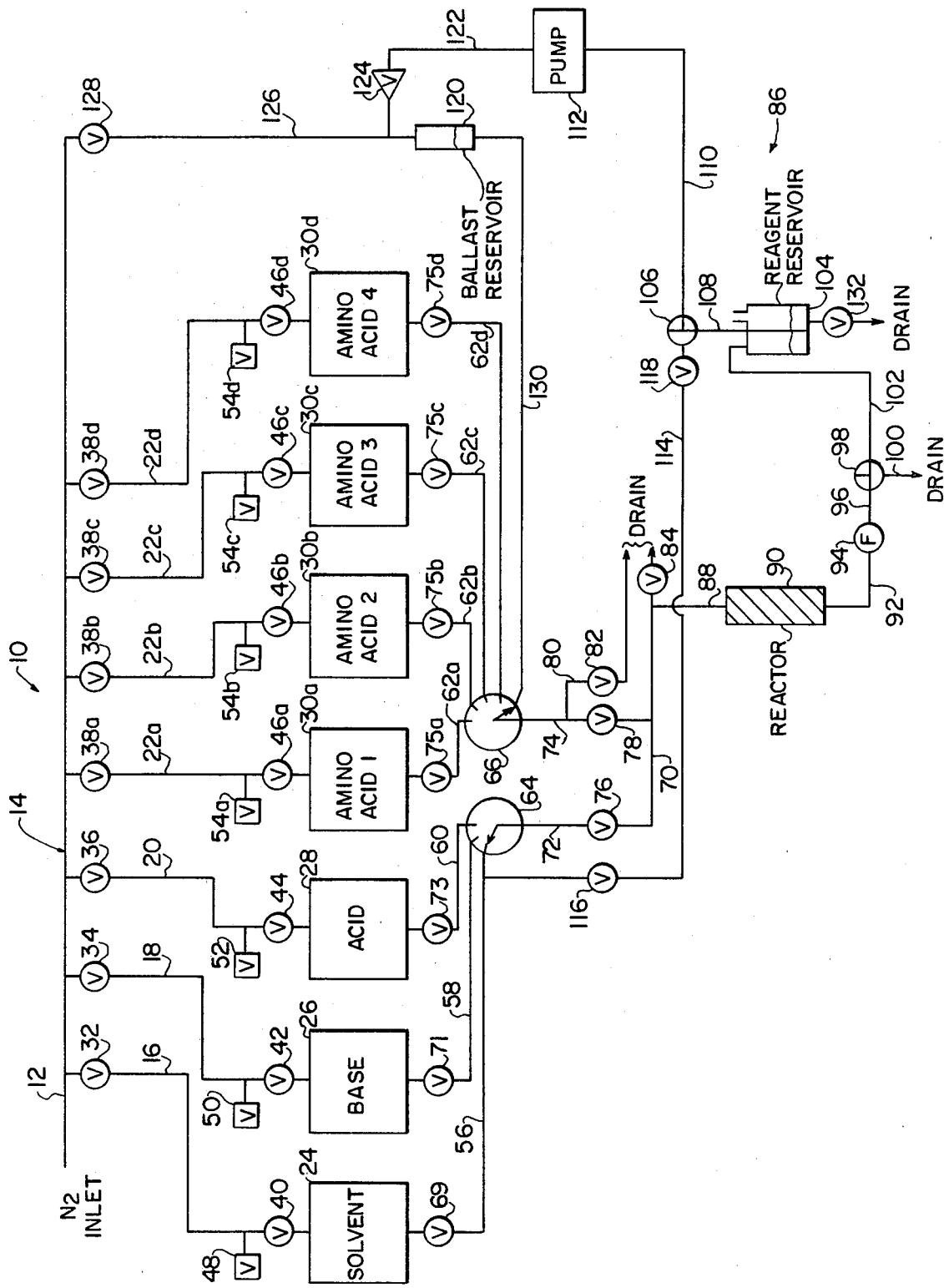

APPARATUS FOR HIGH PRESSURE PEPTIDE SYNTHESIS

FIELD OF THE INVENTION

This invention relates to an apparatus for the synthesis of peptides, polypeptides, and proteins. More particularly, this invention relates to an apparatus wherein the peptide, polypeptide, or protein is "grown" on an insoluble support in a continuous flow reactor under elevated pressures.

BRIEF DESCRIPTION OF PRIOR ART

Classically, sequential polypeptides have been prepared by extremely laborious techniques wherein the intermediates have been isolated after the addition of each amino acid moiety. This has made the synthesis complicated and the preparation of long chain polypeptides nearly impossible because of low yields and/or racemization or other side reactions. In 1963, Merrifield (J. Am. Chem. Soc., 85, 2149) and Letsinger and Kornet (J. Am. Chem. Soc., 85, 2045) suggested the use of an insoluble polymer support for the growing peptide chain. This process permitted the purification of the growing peptide chain, prepared by classical synthetic methods, without isolating the intermediates. In such a process, the insoluble support is provided a reactive substituent group and a protected amino acid coupled thereto either via the amino or carboxyl group. Then using a series of deprotection and coupling reactions, the peptide is synthesized in a stepwise manner on the insoluble support. After each deprotection step, the insoluble support and its appended peptide chain are neutralized if necessary and washed before the addition of the next amino acid residue. Finally, the polypeptide is removed from the solid support by use of a suitable cleaving reagent, and any necessary deprotections completed. The final peptide is then subjected to extensive purification.

Although the solid-phase method of peptide synthesis, originally developed by Merrifield, has revolutionized the field of synthetic peptide chemistry, the method is complicated by many problems, especially when applied to large peptides (greater than 10 amino acids). For example, the reactive sites on the insoluble supports employed in the syntheses are located on and within the support at varying degrees or depths of accessibility. Because of shrinkage and swelling of the resin during a normal synthetic procedure, the number of "inaccessible sites" will change throughout the procedure. Another drawback of the Merrifield method is that long reaction times are ordinarily required to complete the coupling reaction.

Manual and automatic apparatuses for the solid-phase peptide synthesis are known. The following U.S. patents disclose such automated apparatuses: U.S. Pat. Nos. 3,531,258 (Merrifield et al.); 3,557,077 (Brunfeldt et al.); 3,647,390 (Kubodera et al.); and 3,715,190 (Park et al.). U.S. Pat. Nos. 3,944,538 (Bodanszky) and 3,951,741 (Pfaender et al.) also disclose apparatuses for the synthesis of peptides.

Other apparatuses for automatically performing chemical processes concerning peptides have also been disclosed in the prior art. The following U.S. patents disclose apparatuses for use with the Edman sequencing technique: U.S. Pat. Nos. 3,725,010 (Penhasi); 4,065,412 (Dreyer); 4,155,714 (Bonner et al.); and 4,153,416 (Bonner et al.). Other chemical apparatuses disclosed in the prior art include the following: A pulsating reactor disclosed in U.S. Pat. No. 2,927,006 (Brooks); a reactor and bypass loop disclosed in U.S. Pat. No. 4,123,601 (Kellum et al.); and a high pressure, high temperature gaseous reaction chamber disclosed in U.S. Pat. No. 4,167,915 (Toole et al.).

OBJECTS OF THE INVENTION

It is an object of the invention therefore to provide an apparatus for the synthesis of polypeptides and proteins which overcomes the aforementioned problems associated with the Merrifield method or approach.

More specifically, it is an object of the invention to provide an apparatus for the synthesis of polypeptides and proteins which offers extraordinarily rapid reaction rates compared to conventional solid phase reactions.

Yet another object of the invention is to provide an automatable apparatus wherein long chain polypeptides of greater than 20 amino acids can be prepared on a large scale, with little, if any, side reactions.

A further object of the invention is to provide an apparatus wherein coupling reactions are complete at every stage of the synthesis regardless of the sequence or structure of the peptides so that the polypeptide or protein product of desired chain length or size requires minimum purification or in many instances no purification after cleavage from the support.

SUMMARY OF THE INVENTION

As disclosed in U.S. Pat. No. 4,192,798 to Verlander et al., an improved method for the synthesis of polypeptide or protein chains on an insoluble solid support resulted in rapid reactions and quantitative yields of the desired product. In addition, 100% deprotection is effected and the washing or neutralizing operations are greatly facilitated. Thus, the present invention is an apparatus for performing this method. The apparatus of the present invention includes a deprotecting agent reservoir, a solvent reservoir, a neutralizing solution reservoir, and a plurality of amino acid reservoirs. A continuous flow reactor packed with an insoluble support is provided and each reservoir is fluidly connected to this reactor. A high pressure pumping means is connectable to the reservoirs to transfer the fluids in the reservoirs to the reactor. During operation, a recycle loop is provided for recycling the amino acids through the reactor under high pressure.

In a preferred embodiment, the high pressure pumping means includes a source of pressurized inert gas which is connected to each of the reservoirs. The pressurized gas acts to maintain the fluids in the reactor under a high pressure as the fluids are transferred to the reactor. During use of the recycle loop, the recycle loop is also preferably maintained under a high pressure by a connection to the source of pressurized gas. The connection to the pressurized gas is made via a ballast chamber in the recycle loop. The recycle loop also includes a reagent reservoir in which the fluid conducted through the reactor accumulates and a recycle pump means to pump this accumulated fluid to the ballast chamber. From the ballast chamber, the fluid is then conducted to the reactor. Preferably, the gas employed is nitrogen and the continuous flow reactor is a column reactor. It may also be advantageous to control the temperature of the reactor and the reservoirs.

Other features and advantages of the present invention are stated in or are apparent from the detailed description of the presently preferred embodiments of the invention found herein below.

BRIEF DESCRIPTION OF THE DRAWING

FIG. 1 is a schematic flow diagram of the high pressure flow system of the present invention.

DETAILED DESCRIPTION OF THE PREFERRED EMBODIMENT

With reference now to the drawing, a presently preferred embodiment of the present invention is depicted in FIG. 1 and comprises a high pressure flow system 10 which is attached to a source of high pressure nitrogen by an inlet line 12. Inlet line 12 forms an inlet manifold 14 from which a number of supply lines 16, 18, 20, 22a, 22b, 22c, and 22d extend. As shown, these supply lines extend, respectively, to a solvent reservoir 24, a base reservoir 26, an acid reservoir 28, and amino acid reservoirs 30a, 30b, 30c and 30d. Each supply line 16, 18, 20 and 22 a–d also includes a respective shut-off valve 32, 34, 36, 38a, 38b, 38c and 38d located adjacent manifold 14 and a second shut off valve 40, 42, 44 and 46 a–d located adjacent each respective reservoir 24, 26, 28 and 30 a–d. Located between each respective shut off valve along each line 16, 18, 20 and 22 a–d is a pressure relief valve 48, 50, 52 and 54 a–d.

Running from each reservoir 24, 26, 28 and 30 a–d are respective outlet supply lines 56, 58, 60, 62a, 62b, 62c and 62d. Outlet supply lines 56, 58 and 60 are connected to a solvent/reagent selector valve 64 while outlet supply lines 62a to 62d are connected to an amino acid selector valve 66. As shown, outlet supply lines 56, 58, 60 and 62 a–d have a respective shut off valves 70, 72, 74 and 76a–d adjacent the respective reservoirs 24, 26, 28 and 30 a–d. Flushing selector valve 64 and amino acid selector valve 66 are respectively connected to an outlet manifold 70 by selector outlet lines 72 and 74 which have shut-off valves 76 and 78 therein. Selector outlet line 74 is also connected to a system drain by a drain line 80 having a shut-off valve 82.

Outlet manifold 70 is connected to the system drain through a shut-off valve 84. Outlet manifold 70 and amino acid selector valve 66 form part of a recycle loop 86. Recycle loop 86 is depicted in the position for recycling and includes a supply line 88 connecting manifold 70 to a continuous flow column reactor 90. Reactor 90 is connected by a line 92 to a flow control valve 94 which in turn is connected by a line 96 to a two-way recycle/normal selector valve 98. Valve 98 is connectable to the system drain by a line 100 but in the recycle mode shown is connected by a line 102 to the top of a reagent reservoir 104. The bottom of reservoir 104 is connected to a three-way selector valve 106 by a line 108 and to the system drain through valve 132. In the recycle mode, three-way valve 106 is connected by a line 110 to a pump 112. However, three-way valve 106 is also connectable to outlet supply line 56 of solvent reservoir 24 by a line 114 having shut-off valves 116 and 118. Pump 112 is connected to the top of a ballast reservoir 120 by a line 122 which has a one-way valve 124 therein. The top of ballast reservoir 120 is also connected to inlet manifold 14 for the high pressure flow system by a line 126 having a shut-off valve 128 therein. The bottom of ballast reservoir 120 is connected to amino acid selector valve 66 by a line 130.

It is contemplated that the method of operation of the present invention for the synthesis of a polypeptide chain will be the same as disclosed in U.S. Pat. No. 4,192,798 which is herein incorporated by reference. The operation of high pressure flow system 10 occurs in the following manner. Initially, reservoirs 24, 26, 28, and 30 a–d are filled with the appropriate fluid and a source of high pressure nitrogen gas is connected to inlet line 12. Continuous flow column reactor 90 is packed with a C-terminal amino acid-containing support or alternatively with any other resin support containing reactive sites to which suitably protected and activated amino acid derivatives are attached in situ. Examples of resin supports commonly used are derivatized crosslinked polystyrenes, crosslinked polyacrylamides, porous glass, silica, etc. Finally with relief valves 48, 50, 52, and 54 a–d closed, shut-off valves 32, 34, 36, 38 a–d, 40, 42, 44, 46 a–d, 70, 72, 74 and 76 a–d are opened so that the fluids contained in reservoirs 24, 26, 28, and 30 a–d are pressurized by the nitrogen gas and system 10 is ready for use.

Before a coupling of an amino acid residue from amino acid reservoirs 30a to 30d can take place, the first residue already on the support in reactor 90 must be deprotected. Deprotection of the first amino acid residue on the resin as well as on each of the subsequently coupled amino acid residues is carried out by directing an appropriate deprotecting agent which may be either an acid or a base through reactor 90. In the instance that the deprotecting agent is an acid it is contained in reservoir 28. Thus, after moving solvent/reagent selector valve 64 appropriately, shut-off valve 76 is opened so that approximately 5 column volumes of fluid from reservoir 28 is driven under pressure by the nitrogen gas through outlet supply line 60, selector valve 64, line 72, outlet manifold 70 and supply line 88 into and through reactor 90. Conveniently, flow control valve 94 has been preset to the desired flow rate and recycle/normal selector valve 98 is positioned such that the deprotecting agent is conducted to the system drain through line 100. As disclosed in U.S. Pat. No. 4,192,798, it is an important feature of the method of synthesis of the polypeptide chain that the reactions are conducted under elevated pressures. By use of the nitrogen gas pressure to drive the deprotecting agent and the flow control valve, the deprotecting agent in reactor 90 is maintained at a high pressure and in continuous flow as desired.

After deprotecting, the deprotecting agent from reservoir 28 must be washed from reactor 90. Thus, in the same manner that liquid from reservoir 28 was conducted through reactor 90, a liquid solvent from reservoir 24 is passed through reactor 90 to the system drain. In the case where the deprotecting agent is an acid, the peptide on the resin must next be neutralized by washing with an appropriate base from reservoir 26 using the same procedure. This neutralization is then followed by another washing with the liquid solvent from reservoir 24.

After the above steps have been completed, a free α-amino group on the amino acid-resin is ready for coupling with the next desired protected amino acid. By use of amino acid selector valve 66, an appropriate activated amino acid selected from a reservoir 30 a–d is passed through line 74, valve 78, manifold 70, line 88, and into reactor 90. As discussed above, the amino acid is driven under the pressure of the pressurized gas to reactor 90. A two to ten fold molar excess should be passed through reactor 90 over a sufficient time period to effect coupling. In order to use smaller excesses and/or longer coupling times, recycle loop 86 is used. Thus, as the amino acid is passed through reactor 90 and flow control valve 94, selector valve 98 is opened to conduct the activated amino acid derivative to reagent reservoir 104. After a sufficient volume of amino acid has accumulated in reservoir 104, the appropriate one of the valves 76 through which the amino acid from the selected one of the reservoirs 30 was conducted is closed. Next, valve 128 is opened and selector valves 106 and 66 are turned to the "recycle" position. Pump 112 is then activated to pump the amino acid accumulated in reagent reservoir 104 through selector valve 106 and one-way valve 124 and into ballast reservoir 120. Once in ballast reservoir 120, the amino acid is pressurized by the pressurized gas conducted through valve 128 and line 126. This causes the amino acid to flow out of the bottom of ballast reservoir 120, through line 130, amino acid selector valve 66 and valve 78, and into reactor 90. Again, it should be noted that the amino acid is conducted through reactor 90 while under an elevated pressure and in a continuous manner. From reactor 90, the amino acid is again conducted to reagent reservoir 104 so that it can be recycled through reactor 90 any number of times.

When coupling is completed, the reactor is washed by passing the solvent contained in solvent reservoir 24 through reactor 90. In order to wash reactor 90, selector valve 64 is moved to the "solvent" position, valve 76 is opened, and valve 98 is moved to the "drain" position. Where recycle loop 86 was used to recycle the amino acid through reactor 90, recycle loop 86 must also be washed. To wash recycle loop 86, valves 116 and 118 are opened, selector valve 106 is turned to the "flush" position, and valve 82 is opened. The solvent passes through recycle loop 86 from selector valve 106 to the system drain beyond valve 82. In order to keep recycle loop 86 primed with solvent, valve 82 is closed first, followed by the closing of valves 118 and 116. Just before valves 76, 116 and 118 are closed to end the washing of reactor 90 and recycle loop 86 selector valve 98 is returned to the "recycle" position and selector valve 106 to the rinse position causing some solvent to pass through lines 102 and 108 and be accumulated in reservoir 104. Reservoir 104 is then drained by opening valve 132.

The above sequence of reactions, (deprotection, washing, neutralization, washing, coupling, and washing) is repeated until the desired sequence of amino acids has been assembled on the insoluble support. The entire series of coupling reactions in the above described steps is conducted under a reactor pressure of at least atmospheric pressure plus 25 psi (i.e., at least 40 psi), preferably in the range 100 psi to 1000 psi although pressures of up to 10,000 psi may be used. The completed peptide sequence is then removed from the insoluble support by any of the standard methods. If desired, cleavage of the completed peptide sequence can be carried out in the reactor and under the high pressure of the apparatus provided the reactor is resistant to the cleaving agent.

The apparatus depicted in the FIGURE is preferably made from stainless steel components rated for at least 1500 psi; except for those components which do not contact solvent or reagents, such as manifold 14 and the associated shut-off valves and pressure relief valves, which can be made of brass. Pump 112 is also rated at pressures of at least 1500 psi and a suitable pump is Milton-Roy model #2396-89 which is rated at up to 6,000 psi at flow rates of 46 to 920 ml/hr. Ballast reservoir 120 can be constructed as a small cylindrical vessel such as a steel column similar to that used for reactor 90.

In the preferred embodiment, the system 10 is totally automated by solenoid-operated valves which are controlled by an appropriate microprocessor system. The microprocessor system also includes sensors which monitor flowrates and pH values to ensure complete removal of acidic or basic reagents during the washing steps. Where system 10 is automated, it is also desirable to incorporate a means for mixing the protected amino acid solutions with the appropriate activating reagent immediately prior to addition to reactor 90.

EXAMPLE 1

For acid-cleavable $N^\alpha$-protecting groups.

Protecting groups such as the t-butyloxycarbonyl (Boc), biphenylisopropyloxcarbonyl (Bpoc), o-nitrophenylsulfenyl (Nps) groups, etc. are cleaved using acidic reagents, such as solutions of hydrogen chloride, trifluoroacetic acid or methanesulfonic acid in the appropriate organic solvent. Then, a single amino acid is added to 1 gram of a 2% crosslinked polystyrene resin in a 1.2×5 cm column derivatized with a protected amino acid, reactor in the system according to the following. It should be noted that flow rates are controlled by adjusting flow control valve 94.

Cleavage of the protecting group is performed by passing an appropriate acid solution from reservoir 28, such as a 1% solution of trifluoracetic acid in dichloromethane for Bpoc, through reactor 90 for 10 minutes at a flow rate of 5 ml/minute for 10 minutes. Next, reactor 90 is washed to neutrality with solvent from reservoir 24 to remove excess acid at a flow rate of 10 ml/minute for 5 minutes. The amino acid on the resin is then neutralized by passing a 5% base solution, such as diisopropylethylamine, in dichloromethane through reactor 90 at a flow rate of 10 ml/minute for 5 minutes. After neutralization, reactor 90 is washed to neutrality with solvent from reservoir 24 at a flow rate of 10 ml/minute for 5 minutes. Coupling of an activated amino acid is accomplished by passing an appropriately 0.1 M solution through reactor 90 at an appropriate flow rate so that a 2–10-fold molar excess is passed through over a sufficient time period to effect coupling. With the mixed anhydride method of activation, for example, a 4-fold molar excess of activated amino acid is coupled over a 10 minute period. If smaller excesses of amino acid and/or longer coupling times are used, recycling loop 86 is used. With recycle loop 86, 5–10 ml. of amino acid solution is collected in reagent reservoir 104 and recycled with the flow rate adjusted to maintain the level of solution in reservoir 104 constant. Finally, reactor 90 is washed by passing solvent from reservoir 24 through reactor 90 at 10 ml/minute for approximately 10 minutes. Recycle loop 86 is also washed if it was used.

EXAMPLE 2

For base-cleavable $N^\alpha$-protecting groups.

Protecting groups such as the 9-fluorenylmethyloxycarbonyl (Fmoc) group are cleaved under basic conditions in a manner similar to that described above with respect to acidic conditions. In order to add a single amino acid, cleaving with a base, such as for Fmoc, is accomplished by passing a 10% solution of piperidine in DMF through reactor 90 at 5 ml/minute for 10 minutes. Next, the washing to neutrality using the solvent is accomplished as described above and the activated amino acid is then coupled as also described above.

Finally, the reactor is washed with a solvent as described above.

While the present invention has been described with respect to the synthesis of a polypeptide chain, it should be appreciated that the apparatus may be used with other sequential synthetic procedures. In addition, it should be appreciated that the use of a resin having minimal swelling characteristics and ready availability, such as 2% crosslinked polystyrene, is preferred. Also, problems associated with shrinkage and swelling of the resin may be eliminated through use of the single solvent system described. The use of activation methods which do not lead to by-products which are insoluble and, therefore, precipitate are also preferred. If desired, the reactor and reservoirs can also be temperature controlled. The invention also contemplates the use of other suitable pumping means such as mechanical pumps for delivery of solvent and reagents.

With the system described above, rapid reaction rates and the removal of by-products rapidly and quantitatively is achieved. In addition, the forcing conditions lead to quantitative coupling at each step and hidden or hindered sites on the resin (caused by shrinking and swelling of the matrix) are eliminated. The system of the present invention is also easily adapted for large scale synthesis if desired.

Thus, while the invention has been described in detail with respect to an exemplary embodiment thereof, it will be understood by those of ordinary skill in the art that these and other variations and modifications may be effected in the exemplary embodiment within the scope and spirit of the invention.

What is claimed is:

1. An apparatus for synthesizing a polypeptide chain on an insoluble solid support by performing a series of stepwise coupling reactions under high pressure, the apparatus comprising:

means defining a supply of deprotecting agent thereby forming a deprotecting agent reservoir;

means defining a supply of solvent thereby forming a solvent reservoir;

means defining a supply of neutralizing agent thereby forming a neutralizing reservoir;

means defining a supply of at least one amino acid thereby forming at least one amino acid reservoir;

a continuous flow high pressure reactor substantially packed with an insoluble support;

means to selectively couple each said reservoir fluidly to said reactor;

a high pressure pumping means for transfering the fluids contained in said reservoirs through said reactor under high pressure;

a recycle loop means for recycling back through said reactor the amino acid which is delivered to said reactor, said recycle loop means including means defining a reagent reservoir in which the fluid being recycled is accumulated, a recycle pump means for transfering the fluid accumulated in said reagent reservoir back to said reactor, and a means for maintaining said reactor under high pressure during recycling such that the synthesis of the polypeptide chain occurs in said reactor under a pressure of at least about 40 psi.

2. An apparatus as claimed in claim 1 wherein there are a plurality of said amino acid reservoirs, each said amino acid reservoir containing a different amino acid.

3. An apparatus as claimed in claim 2 wherein said high pressure pumping means is a source of pressurized inert gas which is fluidly connected to each said reservoir.

4. An apparatus as claimed in claim 2 wherein the high pressure pumping means is a mechanical pump.

5. An apparatus as claimed in claim 3 wherein said means for maintaining said reactor under high pressure during recycling includes a ballast chamber disposed between said recycle pump means and said reactor, said ballast chamber being fluidly connected to said source of pressurized inert gas so that the recycled amino acid is maintained at a high pressure while in said reactor.

6. An apparatus as claimed in claim 5 wherein said recycle loop means further includes a one-way valve located between said recycle pump means and said ballast chamber to prevent fluid entering said ballast chamber from being forced back by the pressurized gas to said recycle pump means.

7. An apparatus as claimed in claim 1 wherein said continuous flow reactor is a column reactor.

8. An apparatus as claimed in claim 1 wherein said reactor and said reservoirs are temperature controlled.

9. An apparatus as claimed in claim 1 wherein said deprotecting agent reservoir contains a deprotecting agent in a suitable solvent and said solvent reservoir contains the same suitable solvent.

* * * * *